United States Patent
Agarwal et al.

(10) Patent No.: US 10,491,565 B2
(45) Date of Patent: Nov. 26, 2019

(54) GENERATING WEB APPLICATION FIREWALL SPECIFIC VALIDATION RULE

(71) Applicant: SAP SE, Walldorf (DE)

(72) Inventors: Sanjeev Agarwal, Santa Clara, CA (US); Karthik Mohan Mokashi, Mountain View, CA (US); Bhanu Mohanty, Santa Clara, CA (US)

(73) Assignee: SAP SE, Walldorf (DE)

( * ) Notice: Subject to any disclaimer, the term of this patent is extended or adjusted under 35 U.S.C. 154(b) by 154 days.

(21) Appl. No.: 14/977,981

(22) Filed: Dec. 22, 2015

(65) Prior Publication Data
US 2017/0180322 A1  Jun. 22, 2017

(51) Int. Cl.
*H04L 29/06*   (2006.01)

(52) U.S. Cl.
CPC ................ *H04L 63/0263* (2013.01)

(58) Field of Classification Search
CPC .................................................. H04L 63/0263
See application file for complete search history.

(56) References Cited

U.S. PATENT DOCUMENTS

| | | | |
|---|---|---|---|
| 2003/0037236 A1* | 2/2003 | Simon ................... | G06F 21/316 713/161 |
| 2006/0083192 A1* | 4/2006 | Dinescu ................. | H04L 12/22 370/328 |
| 2016/0234186 A1* | 8/2016 | Leblond ................. | G06Q 10/06 |

FOREIGN PATENT DOCUMENTS

WO    WO2007009210 A1 *   1/2007   .........  H04L 63/0245

* cited by examiner

*Primary Examiner* — Joseph P Hirl
*Assistant Examiner* — Hassan Saadoun
(74) *Attorney, Agent, or Firm* — Fish & Richardson P.C.

(57) ABSTRACT

Various embodiments of systems and methods to generate web application firewall specific validation rule are described herein. Initially, a web service metadata is processed to retrieve a plurality of data parameters from the web service metadata. Next, a common validation rule is generated based on the retrieved one or more data parameters. The common validation rule is then modified to generate the web application firewall specific validation rule.

17 Claims, 6 Drawing Sheets

Asm Policy/Common/Odata {
Active
Encoding utf-8
Policy-template POLICY_TEMPLATE_RAPID_DEP
LOYMENT
} ltm policy /Common/vserv1{
  Controls {asm}
  Requires {http}
  Rules {
    Odata {
      Actions {
        Asm Enable Policy /Common/Odata
      }
      Conditions {
        Http-uri contains values {/
          oDataservice/}
      }
    }
  }
  Strategy/Common/first-match
}

GENERATING WEB APPLICATION FIREWALL SPECIFIC VALIDATION RULE

BACKGROUND

The use of internet has grown exponentially over the previous decade. With the increase in the use of internet, there has also been an increase in the number of internet attacks, for example, a SQL injection attack. To prevent these attacks, a web application firewall is used to monitor the data access requests and block it in case the request is a potential attack. A web application firewall may include several validation rules that are defined to monitor the requests and then identify any internet attack.

Existing web application firewall has validation rules that are defined to prevent standard internet attacks such as the SQL injection. Further some other web application firewalls like F5 BIG-IP® also have learning modes that enable these firewalls to monitor the requests for a short time and then generate new rules based on the monitoring. However, the existing web application filters, that are defined to protect against standard or monitored attacks, may not be able to prevent against a new attack.

BRIEF DESCRIPTION OF THE DRAWINGS

The claims set forth the embodiments with particularity. The embodiments are illustrated by way of example and not by way of limitation in the figures of the accompanying drawings in which like references indicate similar elements. The embodiments, together with its advantages, may be best understood from the following detailed description taken in conjunction with the accompanying drawings.

DETAILED DESCRIPTION

Embodiments of techniques for generating web application firewall specific validation rule are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one embodiment. Thus, the appearances of these phrases in various places throughout this specification are not necessarily all referring to the same embodiment. Furthermore, the particular features, structures, or characteristics may be combined in any suitable manner in one or more embodiments.

A web application firewall (WAF) is a network security system to control network traffic from various applications to a web server. The network traffic may be, for example, a Hypertext Transfer protocol (HTTP) request sent from web applications to the web server. The WAF protects the web server by monitoring the request and then blocking it, from reaching the web server, in case it detects any issue with the request. The WAF applies a set of validation rules to the requests for identifying whether the request is a potentially harmful request, for example, whether the request is a SQL injection, a session hijacking, a buffer overflow attack, etc. In case the WAF identifies that a request is potentially harmful, based on the validation rules, then it is blocked or else it is forwarded to the web server. A web application is a client-server software application in which the client runs in a web browser. The validation rule is a set of rules that determine whether a particular data request may be forwarded or not forwarded to the web server. For example, a validation rule may be defined to check whether a particular request is received from a valid session token and in case it is identified that the session token is incorrect then the request may be blocked.

Figure 1:
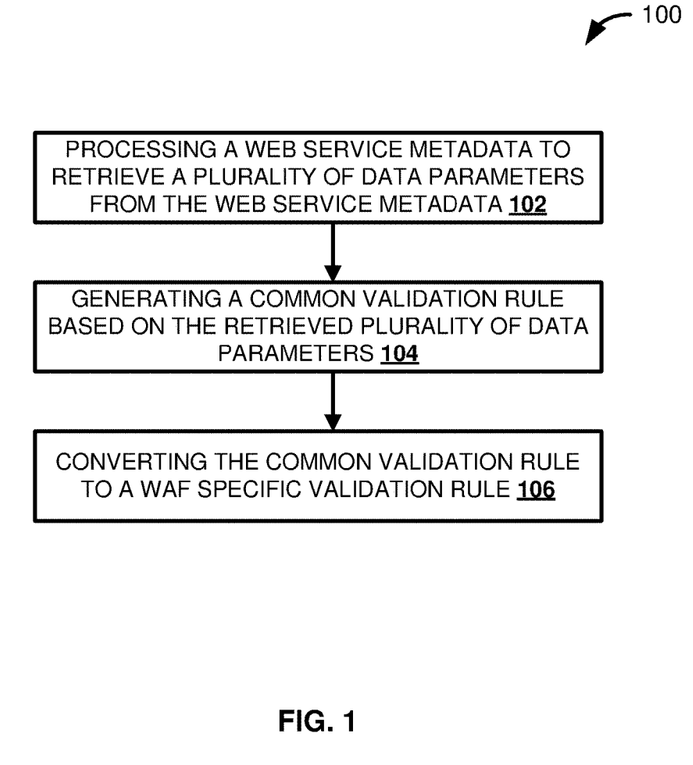
FIG. 1 is a flow diagram illustrating a process to generate a WAF specific validation rule for a WAF, according to an embodiment.

FIG. 1 is a flow diagram illustrating a process 100 to generate a WAF specific validation rule, according to an embodiment. For generating a WAF specific validation rule, initially a web service metadata is processed to retrieve a plurality of data parameters from the web service metadata 102. The web service metadata describes a data model of the data stored at the web server. A data model includes structure and organization of data stored in the web server. In one embodiment, the data model is an Entity Data Model (EDM) that describes the structure of data, regardless of the format it is stored at the web server. The EDM represents the structure of data as entity types and relationships. An entity type, for example customer, is a structured record consisting of a name and properties of the entity. Properties of the entity type define the shape of an entity type and include information about entity type instances. For example, the entity type "customer" may have properties such as "Name", "E-Mail address", etc. that provide information about the "entity".

In one embodiment, the properties may include additional information that further defines the property. For example, the additional information may be constraints on a property of an entity type. For example, constraints on the "Name" property may be ("string") and ("maxlength"=12). The "string" constraint indicates that the property "Name" receives input as "string" and the "maxlength"=12 constraint indicates that the maximum number of characters in the name may be "12". In one embodiment, the web service metadata may be provided as a web service metadata document that describes the data model, for example, in an XML language. For example, web service metadata describing a data model may include:

<edmx:DataServices>
<xmlnsm="http://docs.oasis-open.org/odata/ns/edm">
  <EntityType Name="Product">
    <Property Name="ID" Nullable="false" Type="Edm.String"/>

</EntityType>

The web service metadata includes an entity type "Product" that has a property "ID". Further, the property "ID" has additional constraint "Nullable=False" to indicate that the ID value cannot be Null and a constraint "Type=Edm.string" to indicate that the ID is of type string. A processing is performed on the web service metadata to retrieve data parameters from the web service metadata. The processing may include retrieving of the entity types from the web service metadata. The processing may also include identifying of the different properties and property constraints from the web service metadata. For example a processing may be performed on the web service metadata described in the previous paragraph. Based on the processing, the entity type "Product" may be retrieved from the web service metadata. Further the property "ID" and the corresponding constraints "Nullable=False" and "Type=EDM.string" on the property are also identified.

Next a common validation rule is generated based on the retrieved plurality of data parameters 104. A common validation rule is a validation rule that may be modified to generate a WAF specific validation rule. In one embodiment, the validation rule is generated based on web application security standards, for example, Open Web Application Security Project (OWASP), Information Technology Infrastructure Library (ITIL), Federal Information Processing Standards (FIPS), etc. The different web application security standards provide guidelines on different data parameters that are to be considered when generating validation rules. For example, the OWASP may define that a standard input validation rule for a WAF may include, validating the data types, validating the date range, or validating the data length of the received input.

In one embodiment, the common validation rule includes parameter-specific validation rules for the different data parameters, retrieved from the web service metadata. The common validation rule may be generated depending on the different web application security standards. In this case, a check may be performed to determine whether any of the data parameters, from the retrieved data parameters, are to be considered for generation of a validation rule based on the web application security standards. The different parameter-specific validation rules may then be generated based on the determined data parameters. In the web service metadata example, described with respect to 102, the constraint "Nullable" may be determined as one of the retrieved parameters for which a parameter-specific validation rule is to be generated according to the web application security standards. A common validation rule may then be generated that includes a parameter-specific validation rule for the "Nullable" parameter. For example, the generated common data validation rule may include:

```
<Common Validation Rule>
  <Rule>
    <Parameter name = "ID" type = "string">
      <Constraint type = "com.waf.ValidationRules.Nullable" value =
      "false"/>
    </Parameter>
  </Rule>
</Common Validation Rule>
```

The common validation rule may then be converted to generate WAF specific validation rule 106. In one embodiment, the WAF specific validation rule for a particular web application firewall has a pre-defined format. The common validation rule may be converted to the pre-defined format to obtain the WAF specific validation rule. For example, in case the validation rule is for Apache mod-security module the following validation rule may be generated based on the generated common validation rule described in the previous paragraph:

SecRule &ARGS_GET_NAMES:ID "!@eq 1" "phase:2, t: none,deny,log,auditlog, \ msg: 'Input Validation Alert â€ "Multiple ID parameters', logdata: %{MATCHED_VAR}'"

SecRule &ARGS_GET_NAMES:ID "!^\d {NULL}" "phase:2, t: none,deny,log,auditlog, \ msg: 'Input Validation Alert â€ "DATA CANNOT BE NULL', logdata: %{MATCHED_VAR}'"

The generated WAF specific validation rule may then be used by a WAF to monitor network traffic. As the WAF specific validation rule is generated based on data model of the data stored at the web server, these validation rules provide protection against any potentially harmful data access requests to the web server, for the stored data, by any number of web applications.

Figure 2:
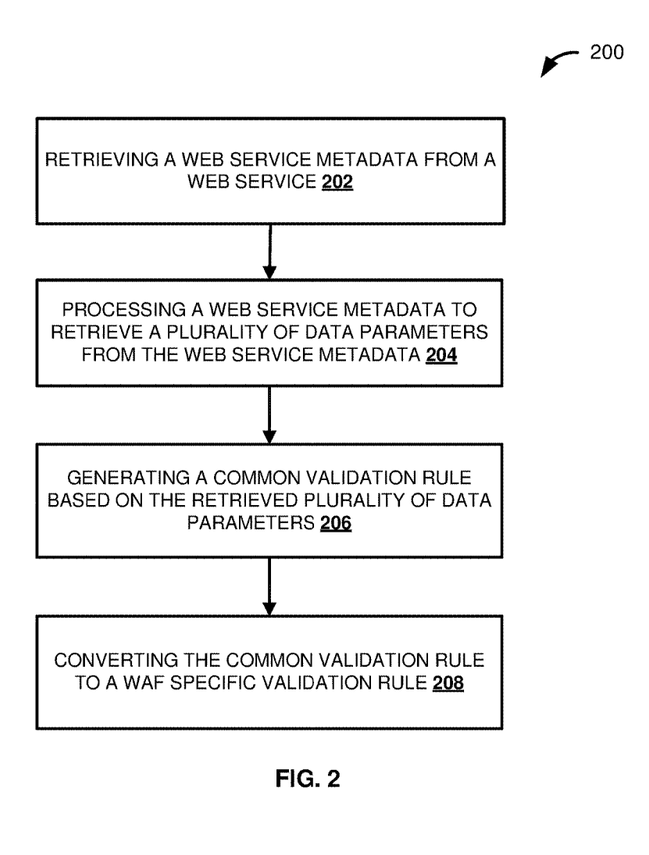
FIG. 2 is a flow diagram illustrating a process to generate a WAF specific validation rule, according to an embodiment.

FIG. 2 is a flow diagram illustrating a process 200 to generate a WAF specific validation rule, according to an embodiment. Initially a web service metadata is retrieved from a web service 202. A web service describes a standardized way of integrating Web-based applications using different open standards, for example, extensible markup language (XML), simple object access protocol (SOAP), web service definition language (WSDL) etc. The web service allows data access, for the data stored at a web server, to the different applications requesting data from the data server. In one embodiment, the web service, for example the Odata service, also includes a web service metadata that describes the data model (e.g., structure and organization of the data stored at the data server), which is exposed as a service endpoint by the web service. A service endpoint may be accessed by the web application at a particular Uniform Resource Locator (URL). The web service metadata may be, for example, a Service Metadata Document that describes data in Entity Data Model (EDM) terms using the Extensible Markup Language (XML).

In one embodiment, a parsing operation is performed on the web service to retrieve the web service metadata from the web service. For example, a service end point may expose a web service endpoint with a URL

```
"http://localhost/oDataservice/$metadata" that provide the following
OData service metadata. :
<edmx: Edmx Version = "4.0"
  xmlns: edmx = https://docs.oasis-open.org/odata/ns/edmx>
  <edmx: Data Services>
    <Schema Namespace = "OData.WAF.Sample"
      <xmlns = "http://docs.oasis-open.org/odata/ns/edm">
      <EntityType Name = "Person" OpenType = "true">
        <Property Name ="UserID" Type = "Edm.String" Nullable =
"false" Maxlength = "12" Unicode = "false"/>
        <Property Name ="Name" Type = "Edm.String" Nullable =
"false" Maxlength = "50" Unicode = "false"/>
      </EntityType>
    </Schema>
  </edmx:Data Services>
</Edmx>
```

Next the web service metadata is processed to retrieve a plurality of data parameters from the web services metadata 204. In one embodiment, the data parameters include entity types and entity type properties. Entity types (for example, Customer, Employee, etc.) are structured records consisting of a name and properties of the web application including a key. For example the entity type "person" in the example, described in the previous paragraph, has two corresponding entity type properties a "UserID" of the person, which is the key to uniquely identify the person, and a "Name" of the person. The web service metadata may also include constraints on the different entity type properties. In the example, described in the previous paragraph, the constraints on the "UserID" property is that the UserID for a person should be a string (Type="EDM.String"), have a maximum length of 12 characters (MaxLength="12"), have a non-null value (Nullable="False"), and have non-Unicode values (Unicode="false"). Similarly, the constraints on the "Name" property is that the Name for a person should be a string (Type="EDM.String"), have a maximum length of 50 characters (MaxLength="50"), not have a null value (Nullable="False"), and should not have Unicode values (Unicode="false").

In one embodiment, the web service metadata also include complex types. Complex types are structured types, similar to the entity type, consisting of a list of properties but with no key. In one embodiment, processing the web service metadata includes retrieving the different entity types included in the web service metadata. For example, the entity type "person" is retrieved from the web service metadata, included in the metadata described at 202.

Processing the web service metadata may also include identifying the different entity type properties and the constraints on the different entity type properties. The web service metadata may be identified by resolving the data parameters to identify the different properties and the different constraints corresponding to the properties. In one embodiment, the "complex types" may be resolved to simple or primitive types. A simple or primitive type may have a single property. In this case, resolving the "complex type" may include identifying each of the properties in the "complex type", where each of the properties may be considered as a primitive type or Boolean type. The properties and the corresponding constraints may then be retrieved from the simple or Boolean type. For example, the entity type Name="Person", included in the web service metadata described in example at 202, has several properties that are resolved by identifying that there are two properties (Property Name="UserID" and Property Name="Name"), along with the constraints corresponding to these properties. The properties "User ID" and "name" and their corresponding constraints (Type="EDM.String", MaxLength="12", Nullable="False", and Unicode="false") and (Type="EDM.String", MaxLength="50", Nullable="False", and Unicode="false"), respectively, are then retrieved from the web service metadata.

Next a common validation rule is generated based on the retrieved data parameters 206. A common validation rule is a rule that may be modified to obtain a WAF specific validation module. In one embodiment, the common validation rule is automatically generated. The common validation rule may be generated based on the different validation rules recommended to be included in web application security standards. A web application security standard, for example OWASP, FISP, ITIL, etc., defines a standard set of validation rules that are to be considered for monitoring a network traffic. For example, the web application security standards may define that the standard validation rules to be included in a WAF for checking network traffic are, for example, "Validate data range", "Validate data length", "Validate expected data types", etc. Each of these validation rules includes a data parameter, for example data range, data type, data length, which may be considered when generating common validation rule.

In one embodiment, a check may be performed to identify whether any of the data parameters, retrieved from the web service metadata, are included in the data parameters that are to be considered for generating validation rules according to the web application security standards. The common validation rule may then be generated based on the identified data parameters from the retrieved data parameters. In one embodiment, parameter-specific validation rules are generated corresponding to the identified data parameters. The parameter specific validation rule may also include a value of the data parameter. The generated parameter specific validation rules are then included in a common validation rule.

In one embodiment, the common validation rule is automatically generated. In this case, a rule generation template may be used to define a format for generating validation rule. The template may include a data parameter type field that defines the data parameter type for which the validation rule is to be applied. The template also includes a data parameter value field that is the value to be monitored for the defined validation rule. In one embodiment, the data parameter value is the value of a data parameter retrieved from the web service metadata. For example, the length for the userID parameter has a value of 12. In this case a validation rule may be automatically generated including a data parameter type field "com.waf.ValidationRules.Length" and a data value "12" (<constraint type="com.waf.ValidationRules.Length" value="12"/>). This rule may be applied to check if a userID in a received data access request has a maximum length of 12. In the web service metadata example, described at 202, the data parameters that are identified to be included in the validation rules, based on the web application security standards are the constraints (Length, Nullable, and Unicode) for the "UserID" and "Name" parameters. In one embodiment, a data parameter validation rule (com.waf.ValidationRules.xxxx> is then generated for each of the data parameters ((Length, Nullable, and Unicode) parameters). The generated data parameter validation rules together form a common validation rule. For example, based on the identified data parameters the common validation rule may include:

```
<Common Validation Rule>
  <Rule>
    <Parameter name = "UserID" type = "string">
      <Constraint type = "com.waf.ValidationRules.Length" value =
        "12"/>
      <Constraint type = "com.waf.ValidationRules.Nullable" value =
        "false"/>
      <Constraint type = "com.waf.ValidationRules.Unicode" value =
        "false"/>
    </Parameter>
  </Rule>
  <Rule>
    <Parameter name = "Name" type = "string">
      <Constraint type = "com.waf.ValidationRules.Length" value =
        "50"/>
      <Constraint type = "com.waf.ValidationRules.Nullable" value =
        "false"/>
      <Constraint type = "com.waf.ValidationRules.Unicode" value =
        "false"/>
    </Parameter>
  </Rule>
</Common Validation Rule>
```

Finally, the generated common validation rule is converted to a WAF specific validation rule 208. The WAF specific validation rule is validation rule that may be used for a particular WAF. Different WAF may have different formats for the validation rules and modifying the common validation rule includes converting the validation rule to a particular format specific to a WAF. For example, the common validation rule, described in the previous paragraph, may be modified to an Apache mod_security based validation rule. The following Apache mod_security based validation rules shows the rules for constraints corresponding to userID:
SecRule &ARGS_GET_NAMES:UserID "! @eq 1" "phase:2, t: none,deny,log,auditlog, \msg: 'Input Validation Alert â€ "Multiple ID parameters', logdata: %{MATCHED_VAR}'"
SecRule &ARGS_GET_NAMES:USERID "!^\d {NULL}" "phase:2, t: none,deny,log,auditlog, \ msg: 'Input Validation Alert â€ "DATA CANNOT BE NULL', logdata: %{MATCHED_VAR}'"
SecRule &ARGS_GET_NAMES:USERID "!^\d {NULL}" "phase:2, t: none,deny,log,auditlog, \ msg: 'Input Validation Alert â€ "UNICODE CANNOT BE NULL', logdata: %{MATCHED_VAR}'"
SecRule &ARGS_GET_NAMES:ID "!^\d {1,12}" "phase:2, t: none,deny,log,auditlog, \msg: 'Input Validation Alert â€ "DATA NOT IN THE CORRECT LENGTH", logdata: %{MATCHED_VAR}'"

The obtained WAF specific validation rule may then be exported to a WAF that can use this rule to monitor and then block/allow a network traffic, for example, a data access request to a web server.

Figure 3:
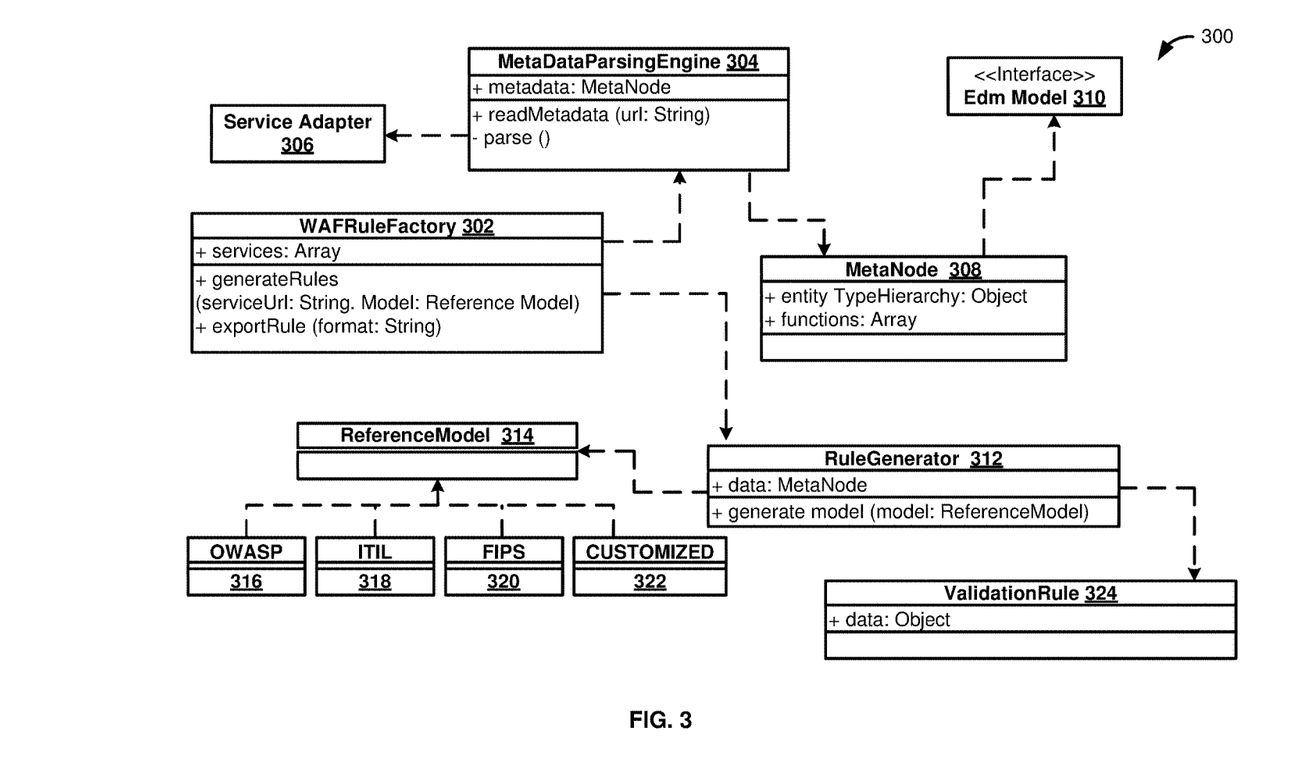
FIG. 3 is a state diagram illustrating a system to generate a WAF specific validation rule, according to an embodiment.

FIG. 3 is a state diagram illustrating a system 300 to generate a WAF specific validation rule, according to an embodiment. The system includes a WAF Rule factory 302 that initiates the WAF specific validation rule generation process by sending a request to Metadata engine 304 for retrieving the web service metadata. The metadata engine 304 requests a service adapter 306 to receive the web service. The metadata parsing engine 304 then executes a readMetadata function to read the web service metadata using a service endpoint URL (readMetadata(url:String)). In one embodiment, the metadata engine 304 calls a parse( )function to retrieve the data parameters included in the web service metadata. The parsed metadata, including the retrieved data parameters, is then transferred to a metanode 308 that stores the metadata. In one embodiment, the different types of data parameters stored in the metanode 308 may be stored according to an Entity Data Model (EDM) 310.

The WAF Rule Factory 302 then requests a rule generator 312 to generate the common validation rule (generateRules (serviceURL: String, model: Reference Model)). For generating the common rule, the rule generator 312 sends a request to the meta node 308 to retrieve the different data parameters included in the web service metadata. The Rule Generator 310 then sends a request to a reference model 314 for receiving the different parameters that are to be included in WAF specific validation rule. In one embodiment, the reference model 314 stores the different web application security standards (OWASP 316, ITIL 318, FIPS 320, or a customized standard 322) to provide the rule generator with the list of standard parameters that are to be included in WAF specific validation rule. The rule generator 312 may then generate the common validation rule based on the obtained data parameters from metanode 308 and list of standard parameters from the reference model 314.

The WAF Rule Factory 302 then executes an exportRules function to convert the common validation rule to the WAF specific validation rule. The WAF Rule Factory 302 transfers the generated WAF specific validation rule to the rule generator 312 that exports it to a validation rule 324 module.

Figure 4:
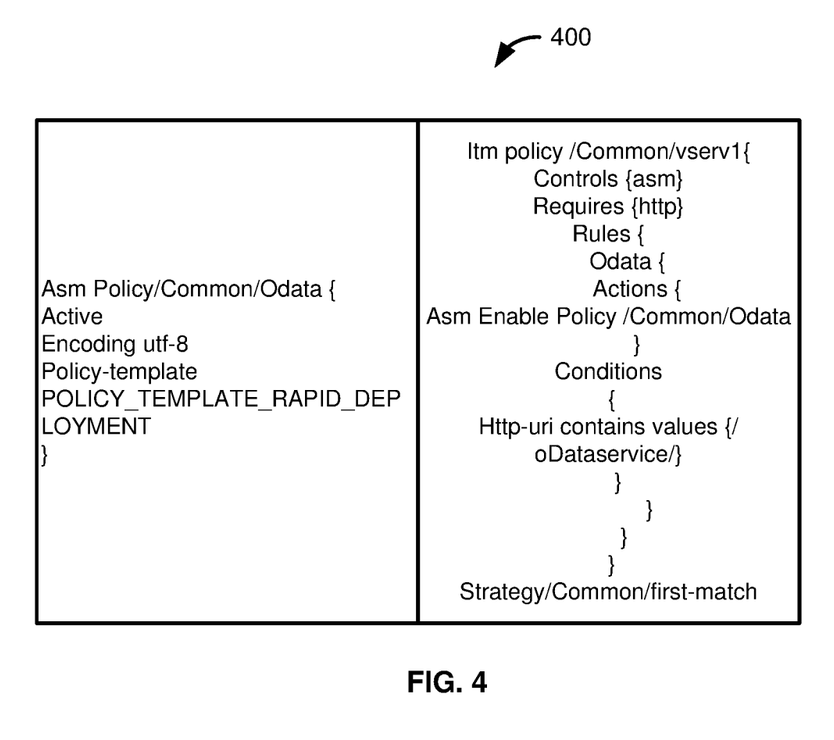
FIG. 4 is an exemplary XML code snippet illustrating a validation policy for a F5 BIG-IP® WAF, according to an embodiment.

FIG. 4 is an exemplary XML code snippet 400 illustrating a validation policy for a F5 BIG-IP® WAF, according to an embodiment. In one embodiment, a policy is defined for each of the web service endpoint, for example, OData end point. A service endpoint is a runtime representation of a service definition. It holds the web service metadata and is available on the provider system at a unique location called service endpoint URL. As shown, the policy includes the common validation rule (policy/common/ODATA) that is enabled. Several parameter rules and corresponding violations, which define the type of error when an input does not satisfy a validation rule, are defined for each of these policies. The policy along with the defined validation rules and violations can be used by a F5 BIG-IP® WAF for monitoring network traffic and block/allow the network traffic.

Figure 5:
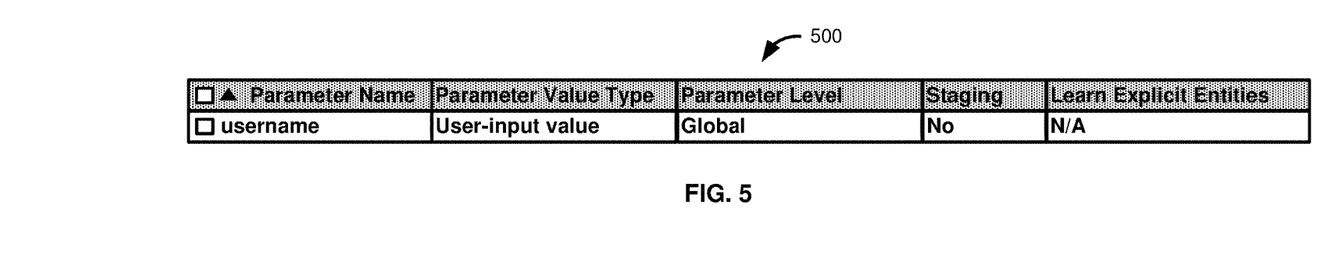
FIG. 5 illustrates an exemplary table including BIG-IP® WAF specific validation rule defined for the validation policy illustrated in FIG. 4, according to an embodiment.

FIG. 5 illustrates an exemplary table 500 including BIG-IP® WAF specific validation rule defined for the validation policy illustrated in FIG. 4, according to an embodiment. The BIG-IP® WAF specific validation rule, shown in table 500, may be obtained by modifying a common validation rule to obtain the rule in the BIG-IP® WAF specific format. As shown, the BIG-IP® WAF specific validation rule indicates that the "user-input value" constraint has to be monitored for the "username" parameter.

Figure 6:
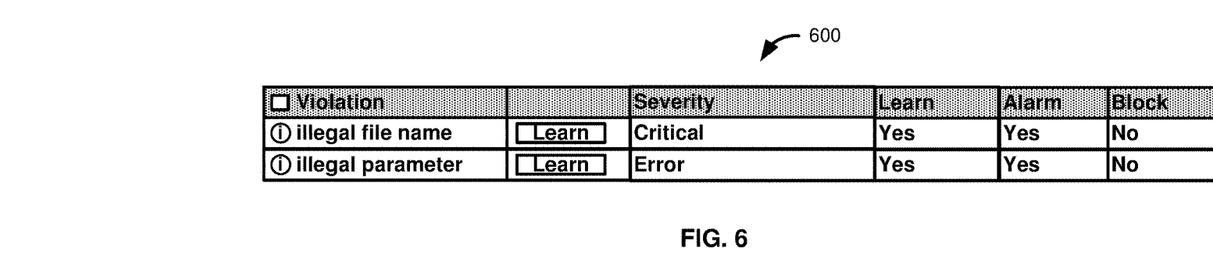
FIG. 6 illustrates an exemplary table including violations corresponding to the BIG-IP® WAF specific validation rule illustrated in FIG. 4, according to an embodiment.

FIG. 6 illustrates an exemplary table 600 including violations corresponding to the BIG-IP® WAF specific validation rule shown in FIG. 4, according to an embodiment. A violation is an error received when a data request does not meet the condition defined in the validation rule. For example, as shown in table 600, the violation may be "illegal file type" or "illegal parameter". The "illegal file type" violation may be received when the user name in the received request is, for example, not a string. Similarly, the violation "illegal parameter" may be received, for example, when more than two values are received in the request and the rules define that values are to be received for only two parameters, "First Name" and "Last Name". The violation table 600 also classifies the violation depending on the level of severity.

Some embodiments may include the above-described methods being written as one or more software components. These components, and the functionality associated may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 7:
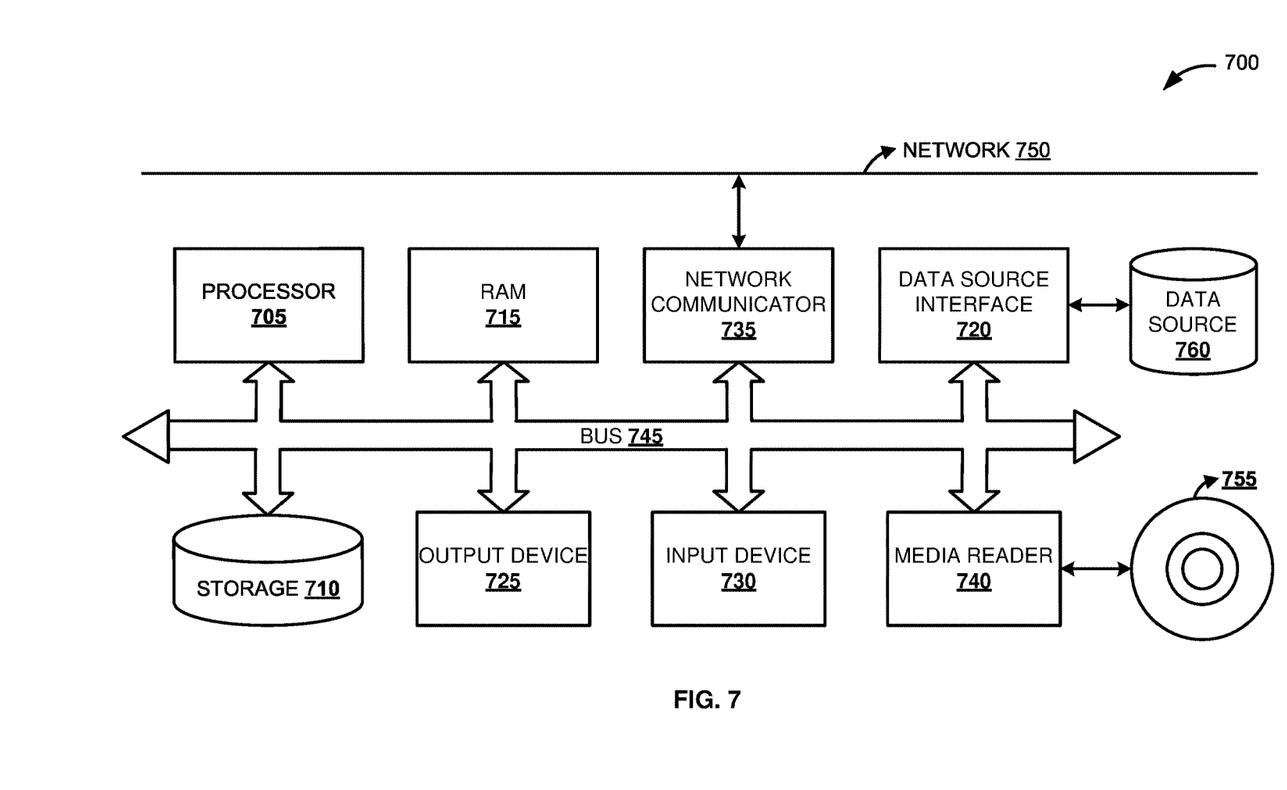
FIG. 7 is a block diagram illustrating a computing environment for generating a WAF specific validation rule, according to an embodiment.

FIG. 7 is a block diagram of an exemplary computer system 700. The computer system 700 includes a processor 705 that executes software instructions or code stored on a computer readable storage medium 755 to perform the above-illustrated methods of the invention. The computer system 700 includes a media reader 740 to read the instructions from the computer readable storage medium 755 and store the instructions in storage 710 or in random access memory (RAM) 715. The storage 710 provides a large space for keeping static data where at least some instructions could be stored for later execution. The stored instructions may be further compiled to generate other representations of the instructions and dynamically stored in the RAM 715. The processor 705 reads instructions from the RAM 715 and performs actions as instructed. According to one embodiment, the computer system 700 further includes an output device 725 (e.g., a display) to provide at least some of the results of the execution as output including, but not limited to, visual information to users and an input device 730 to provide a user or another device with means for entering data and/or otherwise interact with the computer system 700. Output devices 725 and input devices 730 could be joined by one or more additional peripherals to further expand the capabilities of the computer system 700. A network communicator 735 may be provided to connect the computer system 700 to a network 750 and in turn to other devices connected to the network 750 including other clients, servers, data stores, and interfaces, for instance. The modules of the computer system 700 are interconnected via a bus 745. Computer system 700 includes a data source interface 720 to access data source 760. The data source 760 can be accessed via one or more abstraction layers implemented in hardware or software. For example, the data source 720 may be accessed by network 750. In some embodiments the data source 760 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in detail.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the invention are described herein for illustrative purposes, various equivalent modifications are possible within the scope of the invention, as those skilled in the relevant art will recognize. These modifications can be made in light of the above detailed description. Rather, the scope is to be determined by the following claims, which are to be interpreted in accordance with established doctrines of claim construction.

What is claimed is:

1. A computer implemented method to generate a web application firewall specific validation rule, the method comprising:
   receiving, from a web service, web service metadata that describes a data model of data stored on a web server, wherein the plurality of data parameters include a plurality of entity types having one or more entity type properties, and wherein each of the one or more entity type properties includes one or more constraints;
   using the web service metadata to generate a common validation rule, including:
      processing, by at least one processor of a computer, the web service metadata received from the web service to retrieve a plurality of data parameters from the web service metadata;
      identifying one or more data parameters of the plurality of data parameters, wherein the one or more identified data parameters are included in a reference model associated with a plurality of web application security standards; and automatically generating the common validation rule from the identified one or more data parameters based on the plurality of web application security standards, wherein the common validation rule includes a plurality of parameter specific validation rules corresponding to at least one of the plurality of entity types, the one or more entity type properties, and the one or more constraints on the one or more entity type properties; and modifying the common validation rule to generate the web application firewall specific validation rule in accordance with the data model of the data stored on the web server, including converting the common validation rule in a first format into a second format specific to a particular wireless application firewall, the second format different than the first format; and exporting the web application firewall specific rule to the particular wireless application firewall to enable the particular wireless application firewall to monitor and block network traffic data to the web server, wherein the network traffic data is different than the web service metadata that describes a data model of data stored on the web server.

2. The computer implemented method according to claim 1, further comprising:
storing, at the processor of the computer, the generated common validation rule.

3. The computer implemented method according to claim 2, further comprising:
modifying the stored common validation rule to obtain the web application firewall specific validation rule.

4. A non-transitory computer-readable storage medium to store instructions, which when executed by a computer, cause the computer to perform operations comprising:

receiving, from a web service, web service metadata that describes a data model of data stored on a web server, wherein the plurality of data parameters include a plurality of entity types having one or more entity type properties, and wherein each of the one or more entity type properties includes one or more constraints;

using the web service metadata to generate a common validation rule, including:
processing, by at least one processor of the computer, the web service metadata received from the web service to retrieve a plurality of data parameters from the web service metadata;

identifying one or more data parameters of the plurality of data parameters, wherein the one or more identified data parameters are included in a reference model associated with a plurality of web application security standards; and automatically generating the common validation rule from the identified one or more data parameters based on the plurality of web application security standards, wherein the common validation rule includes a plurality of parameter specific validation rules corresponding to at least one of the plurality of entity types, the one or more entity type properties, and the one or more constraints on the one or more entity type properties; and modifying the common validation rule to generate the web application firewall specific validation rule in accordance with the data model of the data stored on the web server, including converting the common validation rule in a first format into a second format specific to a particular wireless application firewall, the second format different than the first format; and exporting the web application firewall specific rule to the particular wireless application firewall to enable the particular wireless application firewall to monitor and block network traffic data to the web server, wherein the network traffic data is different than the web service metadata that describes a data model of data stored on the web server.

5. The non-transitory computer readable storage medium according to claim 4, further comprises instructions which when executed by the computer further causes the computer to:
store the generated common validation rule.

6. The non-transitory computer readable storage medium according to claim 5, further comprises instructions which when executed by the computer further causes the computer to:
modify the stored common validation rule to obtain the web application firewall specific validation rule.

7. A computer system to generate a web application firewall specific validation rule, the computer system comprising:
at least one processor to execute a program code; and
a memory coupled to the at least one processor, the memory storing the program code for:

receiving, from a web service, web service metadata that describes a data model of data stored on a web server, wherein the plurality of data parameters include a plurality of entity types having one or more entity type properties, and wherein each of the one or more entity type properties includes one or more constraints;

using the web service metadata to generate a common validation rule, including:
processing, by the at least one processor, the web service metadata received from the web service to retrieve a plurality of data parameters from the web service metadata;

identifying one or more data parameters of the plurality of data parameters, wherein the one or more identified data parameters are included in a reference model associated with a plurality of web application security standards; and automatically generating the common validation rule from the identified one or more data parameters based on the plurality of web application security standards, wherein the common validation rule includes a plurality of parameter specific validation rules corresponding to at least one of the plurality of entity types, the one or more entity type properties, and the one or more constraints on the one or more entity type properties; and modifying the common validation rule to generate the web application firewall specific validation rule in accordance with the data model of the data stored on the web server, including converting the common validation rule in a first format into a second format specific to a particular wireless application firewall, the second format different than the first format; and exporting the web application firewall specific rule to the particular wireless application firewall to enable the particular wireless application firewall to monitor and block network traffic data to the web server, wherein the network traffic data is different than the web service metadata that describes a data model of data stored on the web server.

8. The computer system according to claim 7, wherein the program code further stores the generated common validation rule.

9. The computer implemented method according to claim 1, wherein the web application firewall specific validation rule includes a set of rules to determine whether a particular data request may be forwarded to the web server.

10. The computer implemented method according to claim 1, wherein the web application firewall specific validation rule is employed by a web application firewall to control network traffic to the web server.

11. The computer implemented method according to claim 1, wherein the data model is an entity data model (EDM).

12. The non-transitory computer readable storage medium according to claim 4, wherein the web application firewall specific validation rule includes a set of rules to determine whether a particular data request may be forwarded to the web server.

13. The non-transitory computer readable storage medium according to claim 4, wherein the web application firewall specific validation rule is employed by a web application firewall to control network traffic to the web server.

14. The non-transitory computer readable storage medium according to claim 4, wherein the data model is an entity data model (EDM).

15. The computer system according to claim 7, wherein the web application firewall specific validation rule includes a set of rules to determine whether a particular data request may be forwarded to the web server.

16. The computer system according to claim 7, wherein the web application firewall specific validation rule is employed by a web application firewall to control network traffic to the web server.

17. The computer system according to claim 7, wherein the data model is an entity data model (EDM).

* * * * *